United States Patent
Kurz (10) Patent No.: US 9,813,405 B2
(45) Date of Patent: Nov. 7, 2017

(54) SYSTEM AND METHOD FOR PROTECTING TRAIN EVENT DATA

(71) Applicant: Wabtec Holding Corp., Wilmerding, PA (US)

(72) Inventor: Brian E. Kurz, Germantown, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 90 days.

(21) Appl. No.: 14/767,418

(22) PCT Filed: Feb. 24, 2014

(86) PCT No.: PCT/US2014/017960
§ 371 (c)(1),
(2) Date: Aug. 12, 2015

(87) PCT Pub. No.: WO2014/137643
PCT Pub. Date: Sep. 12, 2014

(65) Prior Publication Data
US 2016/0014111 A1     Jan. 14, 2016

Related U.S. Application Data (60) Provisional application No. 61/772,246, filed on Mar. 4, 2013.

(51) Int. Cl.
*H04L 9/32* (2006.01)
*H04L 29/06* (2006.01)
(Continued)

(52) U.S. Cl.
CPC ......... *H04L 63/0807* (2013.01); *B61L 3/002* (2013.01); *B61L 15/0072* (2013.01); *B61L 27/0005* (2013.01); *B61L 27/0077* (2013.01); *G06F 21/44* (2013.01); *G06F 21/552* (2013.01); *H04L 9/3234* (2013.01); *H04L 63/061* (2013.01); *H04L 63/123* (2013.01); *H04L 2209/84* (2013.01)

(58) Field of Classification Search
CPC ....... G06F 21/44; G06F 21/552; H04L 9/3234
USPC .......................................................... 713/172
See application file for complete search history.

(56) References Cited

U.S. PATENT DOCUMENTS

| | | | |
|---|---|---|---|
| 4,405,829 A | 9/1983 | Rivest et al. | |
| 6,295,449 B1 * | 9/2001 | Westerlage | G01D 4/004 455/422.1 |

(Continued)

OTHER PUBLICATIONS

Hartong et al., "Key Management Requirements for Positive Train Control Communications Security," Proceedings of JRC2006 Joint Rail Conference, Apr. 4-6, 2006, pp. 253-262.

*Primary Examiner* — Teshome Hailu
(74) *Attorney, Agent, or Firm* — The Webb Law Firm (57) ABSTRACT

Systems and methods for protecting and preventing unauthorized transfer or downloading of recorded train event data for use in a train event recording system of a train. A train event recording system and an authenticated data storage device are also disclosed. According to one preferred and non-limiting embodiment, provided is a system for protecting recorded train event data, the system including at least one external memory device having encrypted authentication data stored thereon, the encrypted authentication data including authentication data encrypted with at least one first key.

11 Claims, 3 Drawing Sheets

(51) Int. Cl.
*B61L 3/00* (2006.01)
*B61L 15/00* (2006.01)
*B61L 27/00* (2006.01)
*G06F 21/44* (2013.01)
*G06F 21/55* (2013.01)

(56) References Cited

U.S. PATENT DOCUMENTS

| | | | |
|---|---|---|---|
| 6,525,672 B2* | 2/2003 | Chainer | G07C 5/008 307/10.2 |
| 7,769,509 B2 | 8/2010 | Gaughan et al. | |
| 8,311,858 B2* | 11/2012 | Everett | G06Q 40/08 246/45 |
| 9,183,679 B2* | 11/2015 | Plante | H04N 5/76 |
| 2002/0027499 A1* | 3/2002 | Chainer | G07C 5/008 340/426.24 |
| 2004/0015713 A1* | 1/2004 | Abe | G06F 21/10 726/30 |
| 2005/0136949 A1* | 6/2005 | Barnes, Jr. | G06Q 10/1053 455/461 |
| 2005/0143874 A1 | 6/2005 | Peltz et al. | |
| 2008/0116264 A1 | 5/2008 | Hammad et al. | |

\* cited by examiner

SYSTEM AND METHOD FOR PROTECTING TRAIN EVENT DATA

CROSS REFERENCE TO RELATED APPLICATIONS

This application claims benefit of priority from U.S. Provisional Patent Application No. 61/772,246, filed Mar. 4, 2013, which is incorporated herein by reference in its entirety.

BACKGROUND OF THE INVENTION

Field of the Invention

This invention relates generally to train event recording systems and, more specifically, a system and method for preventing the unauthorized transfer of or access to train event data from a train event recording system to an external storage device.

Description of Related Art

Train event recorders and recording systems receive and store train event data from a train management system and/or other components and systems of a locomotive, railcar, track network, wayside equipment, end-of-train unit, head-of-train device unit, and the like. Train event recording systems are designed to be crash-worthy and include crash-resistant housings to preserve the recorded train event data in the event of a crash, derailment, or other type of accident. The train event data may include sensitive information meant only for intended or otherwise authorized recipients. Train event recorders and recording systems may provide download or transfer options to facilitate the transfer of train event data to one or more external storage devices.

The Federal Railroad Administration (FRA) requires train event recording systems to comply with basic specifications, although the capabilities of these systems can be enhanced beyond these requirements. To be in compliance, all leading locomotives of trains in the United States that travel faster than 30 miles per hour on a United States rail network must have crash-worthy event recording systems that record certain safety-critical events needed for investigating an accident.

Train event recording systems may monitor a variety of analog and digital outputs from the train management computer and other sources. The recordings may be stored on at least one solid-state memory device, such as non-volatile RAM or Flash Memory, although various other recording media may be used such as, for example, powered RAM, magnetic tape, and other media. The recording system may write to the media in a continuous loop lasting for several hours, days, or some other predefined time. The recorded train event data can be used to view and analyze specific criteria of the train event data after it is downloaded by a computer.

SUMMARY OF THE INVENTION

Generally, the present invention provides an improved system and method for protecting recorded train event data stored by a train event recording system. Preferably, in some aspects of the present invention, provided is a system and method for protecting recorded train event data, which is recorded during operation of a train, from unauthorized download, access, and/or transfer from a train event recording system to an external storage device.

According to one preferred and non-limiting embodiment, provided is a system for protecting recorded train event data, the system including at least one external memory device having encrypted authentication data stored thereon, the encrypted authentication data including authentication data encrypted with at least one first key. The system further includes a train event recording system on a train, which is in communication with a train management computer, where the train event recording system is programmed, adapted, or configured to: record train event data for the train from the train management computer; determine if the at least one external memory device includes the encrypted authentication data when the at least one external memory device is in communication with the train event recording system; decrypt the encrypted authentication data based at least partially on at least one second key; determine if the authentication data is valid; and facilitate a transfer or cause the transfer of at least a portion of the event data to the at least one external memory device if the authentication data is determined to be valid.

According to another preferred and non-limiting embodiment, provided is a method of preventing unauthorized transfer of train event data from a train event recording system, the method including: providing a plurality of memory devices, wherein each memory device has authentication data, encrypted with at least one first key, stored thereon; storing at least one second key on a computer-readable medium in communication with the train event recording system; determining, with at least one processor, if the encrypted authentication data is on at least one memory device of the plurality of memory devices; decrypting the encrypted authentication data based at least partially on the at least one second key; determining if the at least one memory device is valid based at least partially on the authentication data; and preventing at least a portion of the event data from being transferred to the at least one memory device if the at least one memory device is not determined to be valid.

According to a further preferred and non-limiting embodiment, provided is a method of preventing unauthorized download of event data from a train event recording system, the method including: generating at least one authentication token for at least one storage device; storing the at least one authentication token on the at least one storage device; and providing an event recording system on a train, wherein the event recording system is programmed, adapted, or configured to selectively facilitate access to at least a portion of recorded event data based at least partially on the at least one authentication token.

According to another preferred and non-limiting embodiment, provided is a train event recording system including at least one processor, where the train event recording system is programmed, adapted, or configured to: record train event data; detect an external storage device communicating with the train event recorder; determine if the external storage device is valid based at least partially on encrypted authentication information stored on the external storage device and at least one decryption key; and prevent transfer of at least a portion of the train event data to the external storage device if the external storage device is not valid.

According to a still further preferred and non-limiting embodiment, provided is an authenticated download device for downloading train event data from a train event recording system, the download device including or in the form of a portable data storage device including: at least one interface adapted to facilitate communication between the portable data storage device and the train event recording system; and an authentication token including encrypted authentication data, wherein the authentication token is configured to authenticate the portable data storage device when the portable data storage device is in communication with the train event recording system.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like.

The terms "train event recorder" and "train event recording system," as used interchangeably herein, may refer to any event recording device or system used on a train that records train event data. A train event recording system may include one or more hardware and/or software components in communication with one or more components and/or systems of a train or railway such as, but not limited to, a train management computer, a head-of-train unit, an end-of-train unit, wayside equipment, operator interfaces and/or other like systems and components. A train event recording system is configured to record and store train event data representing information about locomotives, railcars, wayside equipment, track signals, and/or train operators including, but not limited to, velocity, brake pressure, error signals, system states, prompts and user inputs, mandatory directives, movement authority signals, warnings and enforcement information, direction of travel, distance traveled, throttle position, brake operation, headlight status, horn operation, cab signals, audio data, video data, and/or the like. In addition to train event recorders installed in a locomotive and in communication with a train management computer, event recorders may also include railcar event recorders, such as that described by U.S. Pat. No. 7,769,509 to Gaughan et al., the entirety of which is incorporated by reference herein.

According to one preferred and non-limiting embodiment, a train event data protection system may include one or more hardware and/or software components configured to record event data and validate, verify, or otherwise authenticate external data storage devices for downloading the recorded event data. The system may also include one or more external data storage devices having authentication tokens stored thereon to facilitate the train event recording system to identify and authenticate the storage devices. The external data storage devices may include any portable and/or external memory or data storage device such as, but not limited to, solid-state (i.e., flash) memory drives/cards, any type of hard drive, CD-ROMs, DVDs, smart phones, tablet computers, laptop computers, and/or any other media capable of storing data.

In one preferred and non-limiting embodiment, a train event data protection system protects the recorded train event data from unauthorized access and/or transfer from the train event recording system. Individual portable and/or external storage devices may be distributed to a number of authorized users who are authorized to access train event data and transfer the same to their respective storage devices via wired or wireless communication. In order to prevent the unauthorized access to or download of recorded train event data, the system prevents transferring data to unauthorized users by processing an authorization token stored on the individual storage devices. If the authorization token is determined to be valid, the system is configured to allow or otherwise facilitate the transfer of or access to the train event data.

Figure 1:
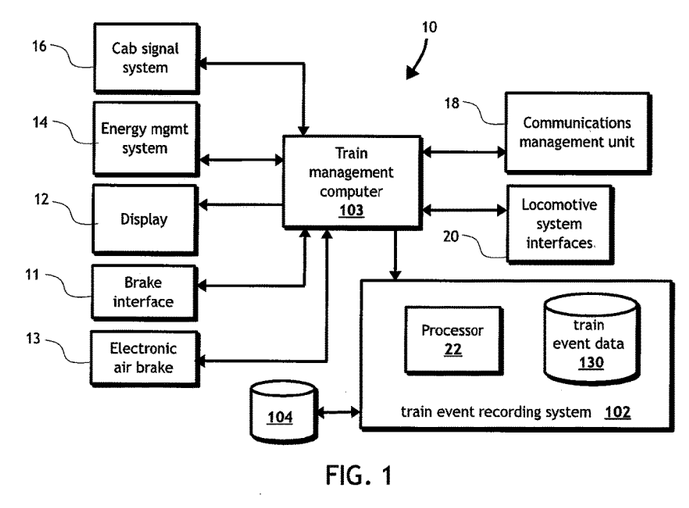
FIG. 1 is a schematic view of one embodiment of a system and method for protecting recorded train event data according to the principles of the present invention.

Referring now to FIG. 1, and in one preferred and non-limiting embodiment, a locomotive 10 is configured with or includes a train event recording system 102. A train management computer 103 or on-board controller is in communication with various locomotive and train components including a cab signaling system 16, an energy management system 14, a display unit 12, a brake interface 11, an electronic air brake 13, a communications management unit 18, locomotive system interfaces (LSI) 20, and the train event recording system 102. The train event recording system 102 includes a processor 22 and recorded train event data 130. In operation, the train event recording system 102 receives and stores data from the train management computer 103 and other components as analog and/or digital signals. The train event recording system 102 may also receive input directly or indirectly from the cab signaling system 16, the energy management system 14, the brake interface 11, the electronic air brake 13, the communications management unit 18, the LSI 20, and other like components of the locomotive 10 and/or train.

With continued reference to FIG. 1, users may obtain the recorded train event data 130 recorded on train event recording system 102 using a portable storage device 104 placed in communication with the train event recording system 102, and transferring the stored train event data 130 to the portable storage device 104. The download or transfer of the train event data 130 to the portable storage device 104 may occur after the portable storage device 104 is verified, authenticated, or otherwise validated by the train event recording system 102 and/or the train management computer 103.

Figure 2:
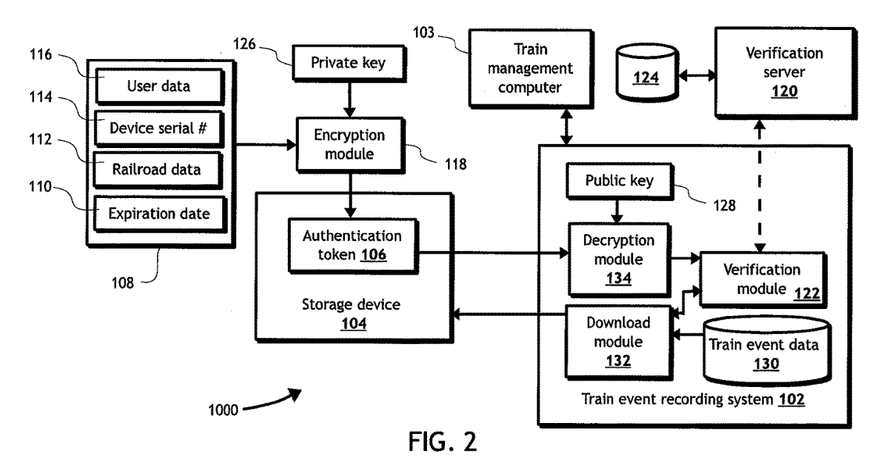
FIG. 2 is a schematic view of one embodiment of a system and method for protecting recorded train event data according to the principles of the present invention.

Referring to FIG. 2, and in one preferred and non-limiting embodiment, a train event data protection system 1000 includes one or more external (e.g., portable) storage devices 104, a verification server 120, and a train event recording system 102. The train event recording system 102 is in communication with the train management computer 103 and records train event data 130 from received digital and/or analog signals. The train event data 130 may be stored on at least one data storage device, including but not limited to crash-worthy memory devices, such as a solid-state memory device (e.g., non-volatile RAM or Flash Memory). However, it will be appreciated that various other data storage devices may be used such as, but not limited to, powered RAM, magnetic tapes, hard drives, and/or other media.

In this embodiment, the storage device 104 includes an authentication token 106 stored thereon which contains or represents at least a portion of authentication data 108. The authentication data 108 may include, for example, user data 116, railroad data 112, a device serial number 114, and an expiration date 110. It will be appreciated that the authentication data 108 may include other types of information that can be used for identifying and/or authenticating one or more users or entities. The user data 116 may include identifying or associated information for a particular user, group or class of users, or entity, such as one or more names, identification numbers, or the like. The railroad data 112 may include identifying or associated information for a particular railroad with which a user is associated, a group or class of railroads, a geographic area or boundary, a track-specific area or boundary, or some entity, such as one or more names, identification numbers, or the like. The device serial number 114 may include a unique identifier assigned to the storage device 104 such as, but not limited to, a string of characters, an identification number, or the like. The expiration date 110 may include, for example, a preset time period after which the authenticity of the storage device 104 and/or associated user is set to expire, or a specific date on or after which the authenticity of the storage device 104 and/or associated user is set to expire. The authentication token 106 may be generated by an encryption module 118 and based at least partially on the authentication data 108 and at least one key or key value, such as a private key 126, which are input into the encryption module 118.

With continued reference to FIG. 2, the encryption module 118 uses the private key 126 to encrypt at least a portion of the authentication data 108 by any number of encryption algorithms. For example, an exemplary algorithm may include performing an exclusive-or (XOR) operation with the binary representation of the authentication data 108 and a binary representation of the private key 126, or a key or key value generated based on the private key 126. However, various other encryption algorithms may be used to transform at least a portion of the authentication data 108 using the private key 126. The encrypted authentication information is then stored as an authentication token 106 on the storage device 104.

Although the terms "private key" and "public key" are used to describe non-limiting embodiments of the present invention, it will be appreciated that other embodiments may use identical first and second keys or key values (e.g., symmetrical key encryption) rather than asymmetrical keys. Further, the terms "public key" and "private key" may refer to any asymmetrical keys without regard for how these keys are used or disclosed.

Still referring to FIG. 2, once the storage device 104 is provided to an authorized user, that user is authorized to download train event data 130 from the train event recording system 102 by placing or bringing the storage device 104 into communication with the train event recording system 102 and requesting the transfer of some or all of the train event data 130 to the storage device 104. The train event recording system 102 determines if an authentication token 106 is present on the storage device 104. If no token 106 is identified, the storage device 104 is not validated and the train event recording system 102 prevents the user from downloading or otherwise accessing the stored train event data 130. In addition, it is envisioned that, if the train event recording system 102 determines that an authentication token 106 is not on the storage device 104, a warning or alert may be generated by the train event recording system 102 and/or train management computer 103 and stored or transmitted to a back-office system to indicate that an unauthorized download was attempted. A warning or alert may also be displayed on or at the train event recording system 102 to indicate to the user that the storage device 104 is not accepted by the train event recording system 102.

With continued reference to FIG. 2, if the storage device 104 does include an authentication token 106, the decryption module 134 decrypts the encrypted authentication information contained in or represented by the token 106 with a public key 128. The public key 128 may be stored on a computer. The decryption module 134 reverses the encryption process and the verification module 122 communicates the decrypted authentication information 108 to the verification server 120. The verification server 120 is configured to compare the authentication data 108 with an authentication database 124 and determine if the storage device 104 is authorized to receive the train event data 130. In one example, the comparison may include identifying the device serial number 114 and determining, based on a query of the authentication database 124, whether that serial number is associated with the identified user data 116.

Still referring to FIG. 2, the verification server 120 and/or the train event recording system may also compare an expiration date 110 of the authentication token 106 with a current date. If the expiration date 110 precedes the current date, the verification server 120 and/or train event recording system 102 may indicate to the verification module 122 that the storage device 104 is not validated, causing the train event recording system 102 to prevent access to the train event data 130. If the verification module 122 receives an indication that the storage device 104 is valid and authenticated from the verification server 120, it may command or otherwise control a download module 132 to allow or otherwise facilitate access to the train event data 130.

If the verification module 122 receives an indication that the storage device 104 is not valid, a warning or alert may be generated by the train event recording system 102 and/or train management computer 103 and stored or transmitted to a back-office system to indicate that an unauthorized download was attempted. In the circumstance where an authentication token 106 is present on the storage device 104 but is determined to be invalid, the warning or alert may indicate why the authentication token 106 is invalid. For example, if the expiration date 110 has expired, the back-office system may generate a request to provide the user associated with the authentication token 106 and/or storage device 104 with updated or renewed authorization. If the authentication token 106 is not valid because the user data 116 indicates that the associated user is no longer authorized, the warning or alert may indicate information about the user so that any necessary action can be taken. A warning or alert may also be displayed on or at the train event recording system 102 to indicate to the user that the storage device 104 is not accepted by the train event recording system 102 and, in some embodiments, information or a description of the circumstances as to why the storage device 104 has not been accepted. In some instances, the authentication token 106 may be valid for one train event recording system but not the train event recording system 102 that the storage device 104 is in communication with. In such instances, the train event recording system 102 may display, or cause to be displayed, an indication of the appropriate train event recording system for which the storage device 104 is authenticated.

It will be appreciated that the public key 128 and private key 126 may be generated and used to encrypt and decrypt the authentication data 108 with any known asymmetrical encryption methods. In one example, the RSA algorithm explained in U.S. Pat. No. 4,405,829, hereby incorporated by reference in its entirety, may be used. Through the use of asymmetrical cryptography, the public key 128 stored on the train event recording system 102 or elsewhere does not need to be protected. Although many asymmetrical encryption methods involve encrypting data with a public key and decrypting that data with a corresponding private key, the inverse can be used for authentication. If the public key 128 stored on the locomotive or train event recording system 102 does not successfully decrypt the authentication token 106, it can be concluded that the token was not encrypted with the corresponding private key and that, therefore, the external data storage device is not authentic.

As it will be appreciated by those skilled in the art, the public key 128 and private key 126 may be generated by calculating the product of two different prime numbers ("p" and "q") and including an auxiliary value. An integer "e" is chosen, such that $1<e<\phi(n)$, where $\phi(n)$ is equal to $(p-1)(q-1)$, and where the greatest common divisor of $(p-1)(q-1)$ and e is equal to one (1) (such that "e" and $(p-1)(q-1)$ are co-prime). In this example, the value of integer "e" is the public key 128. The private key 126 is equal to $(e-1 \pmod{\phi(n)})$, i.e., the multiplicative inverse of "e." If this method is used, instead of XORing binary representations to create the authentication token 106, and in one preferred and non-limiting embodiment, the token 106 is formed (e.g., encrypted) using the following equation: ((numerical representation of authentication data)$^{(e)}$ mod n), and the encrypted token 106 is decrypted with the following equation: ((encrypted token)$^d$ mod n). It will be appreciated that various other algorithms and calculations can be used for formulating the keys or key values.

In one preferred and non-limiting embodiment, the train event recording system 102 may be configured to allow for key updates. For example, if the train event recording system 102 is provided with network connectivity either directly or indirectly through the train management computer 103, new public keys 128 can be distributed to the train event recording system 102 to keep the system updated. In one example, a new public key 128 is transmitted to the train management computer 103, and the train management computer 103 updates the public key 128 on the train event recording system 102. Moreover, the train event recording system 102 may store a historical list of previous keys or key values used, allowing for the system 1000 to support external storage devices with older private keys 126 for a defined period of time.

Figure 3:
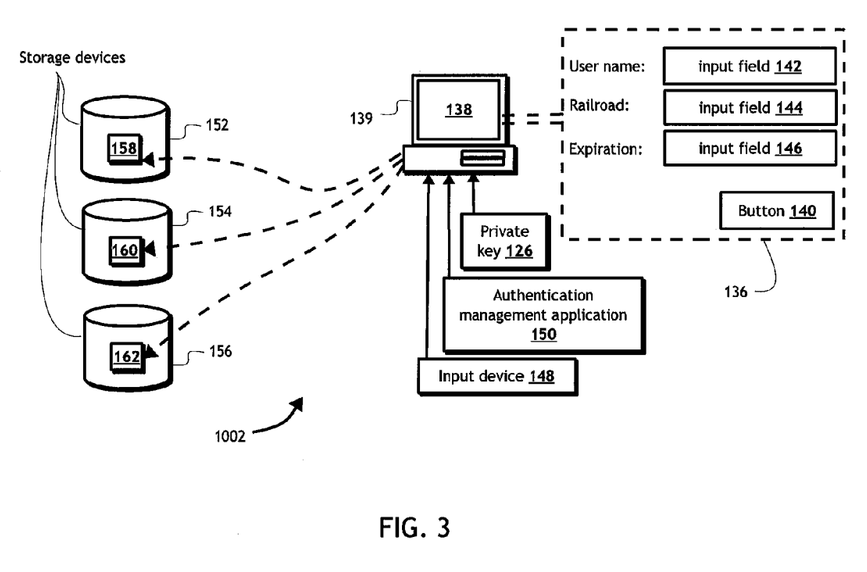
FIG. 3 is a schematic view of one embodiment of a system and method for generating authentication data according to the principles of the present invention.

Referring now to FIG. 3, shown is a system 1002 for preparing storage devices 152, 154, 156 for use, in one non-limiting embodiment, with the train event data protection system 1000 (shown in FIG. 2). An authentication management computer 139 includes a display device 138 and runs an authentication management application 150 that is executed locally or remotely. A private key 126 may be stored on the authentication management computer 139 or inputted through an input device 148. The authentication management application 150 generates a graphical user interface (GUI) 136 on the display device 138. The GUI 136 may include various screens, menus, and input options. For example, the GUI 136 may have input fields 142, 144, 146 for users to input authentication data that may include, but is not limited to, user names and/or identifiers, railroad data or information, and expiration dates. In other examples, the authentication data may be selected through drop-down boxes, check boxes, radio buttons, and/or other input options. The authentication management application 150 may also read a device serial number or other identification parameter from the portable storage devices 152, 154, 156 that was previously stored thereon.

With continued reference to FIG. 3, after inputting or selecting the authentication information through one or more GUIs 136, a user can select a button 140 using the GUI 136, or otherwise cause the authentication management computer 139 to create an authentication token 158, 160, 162 for that data. The tokens 158, 160, 162 are generated by the authentication management application 150, which encrypts the authentication data with the private key 126 to create authentication tokens 158, 160, 162 for each user. The authentication tokens 158, 160, 162 may be stored on respective portable storage devices 152, 154, 156. In one preferred and non-limiting embodiment, the tokens 158, 160, 162 are generated and stored on the respective storage devices 152, 154, 156 individually on an as-needed basis for various employees, contractors, auditors, and/or other users. In other embodiments, the drives 152, 154, 156 may be connected directly to the authentication management computer 139 through any number of wired or wireless communication methods. However, the tokens 158, 160, 162 may also be transmitted over one or more networks to the storage devices 152, 154, 156, such that the tokens can be distributed remotely and updated.

Figure 4:
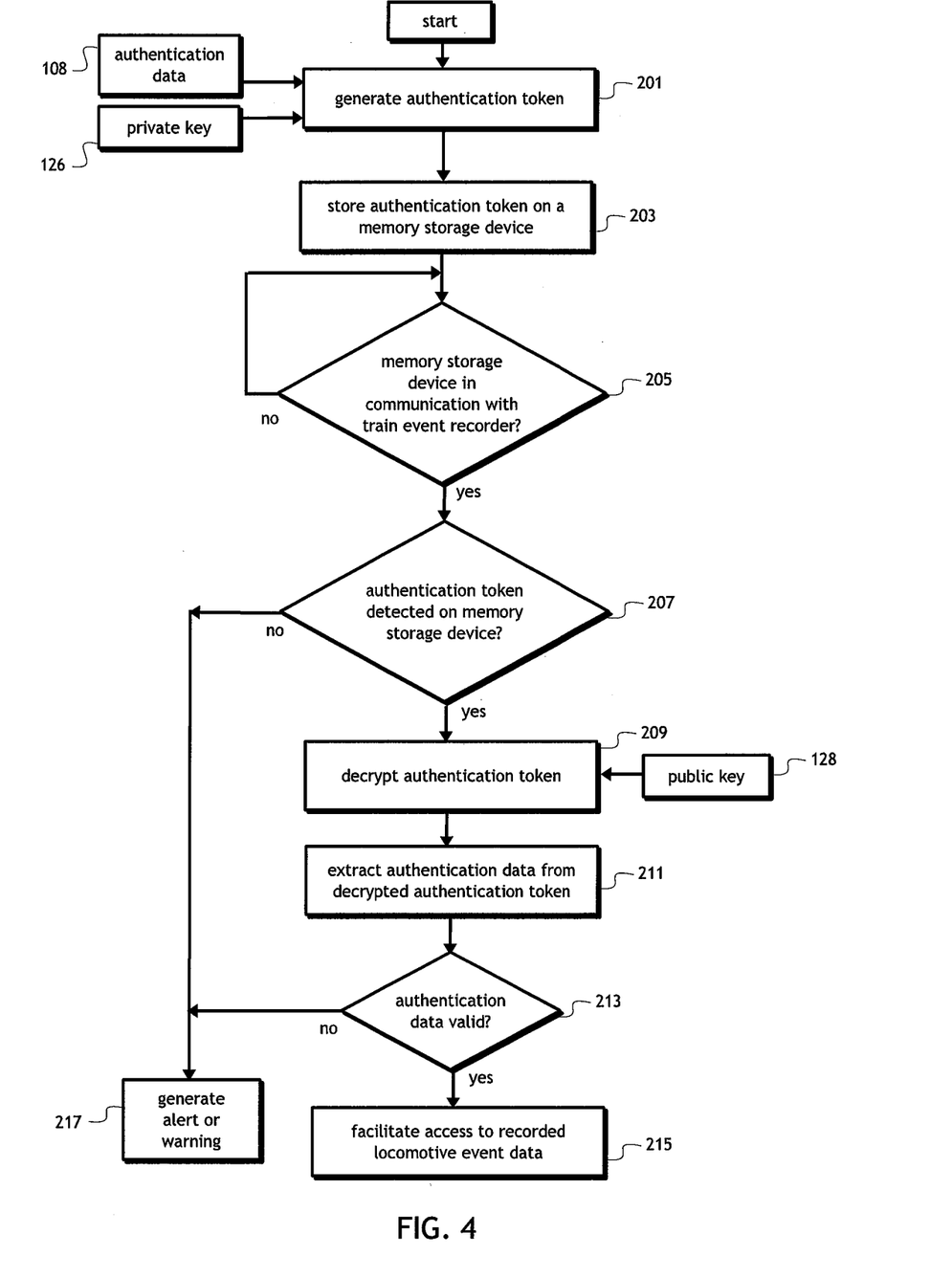
FIG. 4 is a step diagram for another embodiment of a system and method for protecting recorded train event data according to the principles of the present invention.

Referring now to FIG. 4, shown is a flow diagram for a method for controlling access to train event data in a train event recording system according to one preferred and non-limiting embodiment. At a first step 201, an authentication token 106 is generated for a particular user, entity, or group of users based on inputted or selected authentication data 108 and a private key 126. The generated authentication token is stored on a memory storage device in a next step 203. The memory storage device is distributed to a user. In a next step 205, the train event recording system determines if the memory storage device has been placed in communication with it. This determination may be made automatically when a connection is detected, or in response to user input. Once a memory storage device is detected, the method proceeds to a next step 207, where it is determined if the memory storage device has an authentication token. If there is no token on the device, the train event data cannot be downloaded from the train event recording system, and the process proceeds to step 217 in which an alert or warning is generated and transmitted to a back-office system or otherwise displayed.

With continued reference to FIG. 4, if an authentication token is identified on the memory storage device, the method continues to step 209 wherein the authentication token is decrypted with a public key 128. During a next step 211, authentication data is extracted from the decrypted authentication token. In a further step 213, it is determined if the authentication data is valid. If the authentication data is not valid, the train event data cannot be downloaded from the train event recording system and the process proceeds to step 217, wherein an alert or warning is generated and transmitted to a back-office system or otherwise displayed. If the authentication data is determined to be valid, during a next step 215, the train event recording system facilitates or otherwise allows access to the recorded train event data.

In this manner, and according to non-limiting embodiments, storage devices 104 can be prepared for authorized users to facilitate those users to access and download recorded train event data 130 from a train event recording system 102. Authorization tokens 106, generated by encrypting at least a portion of authentication data 108 for a particular user or group of users, can be stored on the storage devices 104 and used to verify, validate, or otherwise authenticate the storage devices 104 when the storage devices 104 are placed in communication with the train event recording system 102. The train event recording system 102 can further communicate information from the authentication tokens 106 or other data stored on the storage devices 104 to a verification server 120 or other back-office system to reference the authentication information 108 against an authentication database 124 and return an indication of whether a particular storage device 104 is authentic. The verification server 120 and/or other back-office system can further log and track downloads, and attempted downloads, of train event data 130.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for protecting recorded train event data, comprising:

a non-transitory memory including program instructions which, when executed by at least one processor of a computer, cause the computer to:
  receive user input;
  generate authentication data based at least in part on the user input; and
  encrypt at least a portion of the authentication data with at least one first key accessible by the computer;
 at least one external memory device comprising the encrypted authentication data; and
 a train event recording system on a train and in communication with a train management computer, the train event recording system configured to:
  record train event data for the train from the train management computer;
  determine if the at least one external memory device comprises the encrypted authentication data when the at least one external memory device is in communication with the train event recording system;
  decrypt the encrypted authentication data based at least partially on at least one second key wherein the at least one first key and the at least one second key are different, wherein the at least one first key comprises at least one private key and the at least one second key comprises at least one public key, and wherein the authentication data is encrypted with an asymmetrical encryption algorithm, wherein the public key is stored on the train event recording system or the train management computer; and
  determine if the authentication data is valid or invalid; and
   if the authentication data is valid, facilitate a transfer or cause the transfer of at least a portion of the event data to the at least one external memory device; and
   if the authentication data is invalid, prevent at least a portion of the event data from being transferred to the at least one external memory device.

2. The system of claim 1, wherein the authentication data comprises at least one of the following: railroad data, user data, a device serial number, an expiration date, or any combination thereof.

3. The system of claim 1, wherein the train event recording system is further configured to detect when the at least one external memory device is in communication with the train event recording system.

4. The system of claim 1, further comprising at least one authentication token stored on the at least one external memory device, the at least one authentication token including at least a portion of the encrypted authentication data.

5. The system of claim 1, further comprising a verification server configured to receive at least a portion of the decrypted authentication data, and transmit an indication to the train event recording system that the at least one external storage device is valid or invalid.

6. A method of preventing unauthorized transfer of train event data from a train event recording system, comprising:
 receiving user input at a management computer;
 generating authentication data based at least in part on the user input;
 encrypting at least a portion of the authentication data with the at least one first key accessible by the management computer;
 providing at least one memory device, wherein the at least one memory device comprises the authentication data;

storing at least one second key on a computer-readable medium in communication with the train event recording system;

determining, with the train event recording system or a train management computer, if the encrypted authentication data is on the at least one memory device;

decrypting, with the train event recording system or the train management computer, the encrypted authentication data based at least partially on the at least one second key, wherein the at least one first key and the at least one second key are different, wherein the at least one first key comprises at least one public key and the at least one second key comprises at least one private key, and wherein the authentication data is encrypted with an asymmetrical encryption algorithm, wherein the public key is stored on the train event recording system or the train management computer;

determining if the at least one memory device is valid or invalid based at least partially on the authentication data; and if the authentication data is valid, facilitating a transfer or causing the transfer of at least a portion of the event data to the at least one memory device; and if the authentication data is invalid, preventing at least a portion of the event data from being transferred to the at least one memory device.

7. The method of claim 6, wherein the authentication data comprises at least one of the following: railroad data, user data, a memory device serial number, an expiration date, or any combination thereof.

8. The method of claim 6, further comprising detecting a connection of the at least one memory device to the train event recording system.

9. A non-transitory computer-readable medium having stored thereon instructions which, when executed by one or more processors of one or more computers, causes the one or more processors to prevent unauthorized transfer of train event data from a train event recording system by performing the steps of:

receiving user input at a management computer;

generating authentication data based at least in part on the user input;

encrypting at least a portion of the authentication data with the at least one first key accessible by the management computer;

providing at least one memory device, wherein the at least one memory device comprises the authentication data;

storing at least one second key on a computer-readable medium in communication with the train event recording system;

determining, with the train event recording system or a train management computer, if the encrypted authentication data is on the at least one memory device;

decrypting, with the train event recording system or the train management computer, the encrypted authentication data based at least partially on the at least one second key, wherein the at least one first key and the at least one second key are different, wherein the at least one first key comprises at least one public key and the at least one second key comprises at least one private key, and wherein the authentication data is encrypted with an asymmetrical encryption algorithm, wherein the public key is stored on the train event recording system or the train management computer;

determining if the at least one memory device is valid or invalid based at least partially on the authentication data; and if the authentication data is valid, facilitating a transfer or causing the transfer of at least a portion of the event data to the at least one memory device; and if the authentication data is invalid, preventing at least a portion of the event data from being transferred to the at least one memory device.

10. The computer readable medium of claim 9, wherein the authentication data comprises at least one of the following: railroad data, user data, a memory device serial number, an expiration date, or any combination thereof.

11. The computer readable medium of claim 9, wherein the instructions further cause the processor to detect a connection of the at least one memory device to the train event recording system.

* * * * *